(12) United States Patent
Campbell et al.

(10) Patent No.: US 7,232,856 B1
(45) Date of Patent: Jun. 19, 2007

(54) FLAME-RETARDANT POLYOLEFIN COMPOUNDS AND THEIR USE IN SURFACE COVERINGS

(75) Inventors: Ewen A. Campbell, Winchester, VA (US); George Noll, Bunker Hill, WV (US); Anthony Corbin, Martinsburg, WV (US); Jividean Arbaugh, Wardnesville, WV (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 10/560,803

(22) PCT Filed: Jun. 14, 2004

(86) PCT No.: PCT/US2004/018786

§ 371 (c)(1), (2), (4) Date: Dec. 15, 2005

(87) PCT Pub. No.: WO2004/113439

PCT Pub. Date: Dec. 29, 2004

Related U.S. Application Data

(60) Provisional application No. 60/479,009, filed on Jun. 17, 2003.

(51) Int. Cl.
*C08K 3/34* (2006.01)
*C08K 3/22* (2006.01)

(52) U.S. Cl. ............ 524/445; 524/405; 524/436; 524/437; 524/447; 428/518; 428/520

(58) Field of Classification Search ........ 524/436–537, 524/405; 428/518, 520
See application file for complete search history.

(56) References Cited

U.S. PATENT DOCUMENTS

| | | | |
|---|---|---|---|
| 5,091,462 A * | 2/1992 | Fukui et al. | 524/504 |
| 5,462,987 A * | 10/1995 | Shinonaga et al. | 524/451 |
| 5,889,087 A * | 3/1999 | Hayashi et al. | 523/173 |
| 5,889,100 A * | 3/1999 | Asai et al. | 524/451 |
| 6,072,005 A * | 6/2000 | Kobylivker et al. | 525/240 |
| 6,232,377 B1 | 5/2001 | Ishihara et al. | |
| 6,414,070 B1 * | 7/2002 | Kausch et al. | 524/445 |
| 6,492,453 B1 * | 12/2002 | Ebrahimian et al. | 524/447 |
| 6,750,282 B1 * | 6/2004 | Schall et al. | 524/445 |
| 6,846,872 B2 * | 1/2005 | Nishihara | 524/474 |
| 6,869,993 B2 * | 3/2005 | Watanabe et al. | 524/210 |
| 6,924,334 B1 * | 8/2005 | Fukatani et al. | 524/445 |
| 2002/0006998 A1 * | 1/2002 | Furukawa et al. | 524/445 |
| 2004/0002569 A1 * | 1/2004 | Kitano et al. | 524/494 |
| 2005/0032959 A1 * | 2/2005 | Cheung et al. | 524/425 |
| 2006/0155035 A1 * | 7/2006 | Metzemacher et al. | 524/445 |

FOREIGN PATENT DOCUMENTS

WO  WO00/66657 A1  11/2000
WO  WO 03/082966  *  3/2003

OTHER PUBLICATIONS

Lan et al., "FR Applications of Plastic Nanocomposites" Jun. 13, 2003 or earlier, Arlington Heights, IL, USA, www.nanocor.com.tech_papers/FRAppsPlastic.asp.

* cited by examiner

*Primary Examiner*—Peter Szekely
(74) *Attorney, Agent, or Firm*—John H. Hornickel

(57) ABSTRACT

A flame-retardant compound is disclosed, comprising a polyolefin alloy and a combination of flame-retardant agents. The polyolefin alloy comprises at least one polyolefin and a metallocene-catalyzed olefin copolymer. The flame-retardant agents comprise a nanoclay and at least one inorganic flame-retardant. An essentially halogen-free flame-retardant compound is preferred. Surface coverings for mammalian-occupied spaces benefit from the properties of the flame-retardant compound.

15 Claims, No Drawings

FLAME-RETARDANT POLYOLEFIN COMPOUNDS AND THEIR USE IN SURFACE COVERINGS

CLAIM OF PRIORITY

This application claims priority from U.S. Provisional Patent Application Ser. No. 60/479,009 filed on Jun. 17, 2003, which is incorporated by reference.

FIELD OF THE INVENTION

This invention relates to flame retardant polyolefin compounds containing both nanoclay and inorganic flame-retardant agents.

BACKGROUND OF THE INVENTION

Fire kills people and destroys property. Any material that offers flame retardance benefits the public. Flame retardants are often added to compounds to provide flame resistance to products made from such compounds.

Nanoclays are exciting additives for a variety of purposes, including flame retardancy. U.S. Pat. Nos. 6,376,591; 6,251,980; 6,232,388; 6,225,394; 6,090,734; 6,050,509; 5,998,528; 5,844,032; and 5,837,763 disclose the manufacture and use of nanocomposites. Nanocor, Inc. is a significant commercial source of exfoliated or intercalated nanoclays and has a web site: www.nanocor.com.

ASTM International (www.astm.org) has established a strict standard for testing the surface burning characteristics of building materials. This test is No. E84 and concerns the fire-test-response standard for the comparative surface burning behavior of building materials applicable to exposed surfaces such as walls and ceilings. The test is conducted with the specimen in the ceiling position with the surface to be evaluated exposed face down to the ignition source. To satisfy E84, the material, product, or assembly shall be capable of being mounted in the test position during the test. Thus, the specimen shall either be self-supporting by its own structural quality, held in place by added supports along the test surface, or secured from the back side.

There are other flame tests, such as MVSS-302 promulgated by the National Highway Transportation Safety Administration of the U.S. government. However, the E84 test is more stringent in performance because it concerns occupied buildings, not vehicles.

U.S. Pat. No. 6,414,070 (Kausch et al.) disclosed flame retardant polyolefin compounds that have passed the MVSS-302 test, in which the nanoclay is a required flame retardant and an inorganic flame retardant is optional.

PCT Patent Publications WO 00/66657 and WO 00/68312 both disclose thermoplastic materials containing both nanoclay and inorganic flame retardants.

None of these three documents report the ability of the compositions disclosed therein to pass the stringent ASTM E84 test.

SUMMARY OF THE INVENTION

The art needs a polyolefinic compound that can pass the ASTM E84 flame test.

The art also needs a polyolefinic compound that is essentially halogen-free.

The present invention solves the problem in the art by providing a polyolefin compound that does pass the ASTM E84 flame test when using the glass-reinforced concrete board substrate.

One aspect of the present invention is a flame-retardant compound, comprising a polyolefin alloy and a combination of flame-retardant agents, wherein the polyolefin alloy comprises a polyolefin and a metallocene-catalyzed olefin copolymer and wherein the flame-retardant agents comprise a nanoclay and at least one inorganic flame-retardant and wherein one inorganic flame-retardant is a hydroxide present in the compound of at least about 65 parts, per 100 parts of polyolefin alloy.

"Polyolefin" includes homopolymers, copolymers, blends of polymers, mixtures of polymers, alloys of polymers, and combinations thereof, where at least one of the polymers is polymerized from an olefin monomer having from 2 to about 8 carbon atoms.

"Metallocene-catalyzed olefin copolymer means a copolymer of two different olefin monomers which have been copolymerized in the presence of a metallocene catalyst.

The combination of flame-retardant agents are grouped according to applicable chemistry.

The first group of flame-retardant agents are nanoclays that provides charring characteristics to reduce loss of structural integrity of the flame-retardant compound in its engineered form.

The second group of flame-retardant agents are traditional inorganic flame-retardants that slow the process of combustion of the flame-retardant compound by a variety of known means, including: releasing volatiles such as water to cool the compound (e.g., hydroxides) or accelerating carbonization (e.g., borates).

The combination of the four groups of flame-retardant compounds provides flame-retardancy which slows the destructive effects of fire and also effectively diminishes incidence of dripping of molten polyolefins during burning of compounds containing such polyolefins.

A feature of the invention is effective flame-retardancy for polyolefin-containing compounds, which are now desired for surface coverings.

Another feature of the invention is that the compounds of the present invention are essentially halogen-free, not only with respect to the polyolefin alloy but also in the flame retardant agents. Moreover, if an optional biocide is used, then the biocide that has been chosen is also essentially halogen-free. "Essentially halogen-free" means that there is no intention to include any halogen moieties in any of the ingredients of the compound of the present invention, but that one can cannot control trace amounts of impurities that may exist in such ingredients.

"Surface coverings" means interior and exterior surfaces of mammalian-occupied spaces. Without limitation, "surfaces" include walls, ceilings, floors, roofs, and portions thereof, and other enclosure-defining areas. Without limitation, "mammalian-occupied spaces" include buildings, vehicles, and other spaces where humans or mammalian animals gather. Without limitation, "vehicles" includes airplanes, ships, boats, automobiles, trucks, trains, and other forms of transport of mammals.

Another aspect of the present invention is a surface covering comprising a flame-retardant compound of the present invention.

Another feature of the present invention is the ability to provide a surface covering that provides flame-retardancy which effectively diminishes incidence of dripping of molten polyolefins during burning of a surface covering containing such polyolefins.

An advantage of the present invention is that surface coverings that are made of polyolefin now can pass certain industry standard tests for wall and other surface coverings to permit their installation in mammalian-occupied spaces.

Additional features and advantages are explained with reference to the embodiments of the invention.

EMBODIMENTS OF THE INVENTION

Polyolefin Alloy

Polyolefins, as defined above for purposes of this invention, are one type of thermoplastic polymers and constitute one type of polymer in the polymer alloy of the present invention.

Within the broad definition above, non-limiting examples of polyolefins suitable for the present invention include polyethylene (including low-density (LDPE), high-density, high molecular weight (HDPE), ultra-high molecular weight (UHDPE), linear-low-density (LLDPE), very-low density, etc.), maleated polypropylene, polypropylene, polybutylene, polyhexalene, polyoctene, and copolymers thereof, and ethylene-vinyl-acetate (EVA) copolymer, and mixtures, blends or alloys thereof.

Metallocene-catalyzed olefin copolymers constitute another polymer in the polymer alloy of the present invention. These copolymers are included in the alloy to provide a modification of the modulus of the polyolefin and to otherwise assist in the processability of the polyolefins during manufacture.

Such metallocene-catalyzed olefin copolymers are well known in the art, such as disclosed in U.S. Pat. Nos. 6,451,894; 6,376,623; and 6,329,454. Such copolymers are available from a number of commercial sources, among them being ExxonMobil and DuPont Dow Elastomers.

It is well known that metallocene catalysis can yield quite precise polymeric structures. Within the possibilities of olefin monomers used in the copolymerization, it is preferred to use ethylene with a second olefin monomer having from 3 to 18 carbon atoms. Of the comonomer choices, octene is preferred because of the variation possible in melt flow properties of the resulting copolymer.

Among the many possibilities of commercial metallocene-catalyzed olefin copolymers are the Engage™ brand of polyolefin elastomers from DuPont Dow Elastomers, which has a web site: www.dupont-dow.com. Among the several grades and products identified by the Engage brand, the polyolefin alloy of the present invention preferably uses Engage 8020 polyolefin elastomer.

The contribution of modulus-modification to the polyolefin improves the performance of the resulting polyolefin alloy as a surface covering. Any perturbations or irregularities in the surface being covered are better addressed by the inclusion of the modulus-modifying copolymer in the alloy. Stated another way, the polyolefin alloy has, to use a term from the polymeric film industry, a better "hand", meaning that the ability of a fabricator is improved to maneuver a large expanse of film formed from the polyolefin alloy of the present invention during manufacturing and application. The polyolefin alone is not so pliable, compliant, or response in feel, or otherwise accommodating to handling and application as the polyolefin alloy which includes the metallocene-catalyzed olefin copolymer according to the present invention.

The alloy therefore contains two quite different types of polyolefin polymerization products that are nonetheless quite compatible: thermoplastics that need modulus modification because the are not so pliable, such as LDPE, LLDPE, and EVA, on the one hand, and thermoplastic polyolefin elastomers which provide modulus modification, such as ethylene-octene copolymers, on the other hand.

The art of surface coverings is migrating away from halogen-containing materials and toward polyolefins in certain higher-priced markets. The polyolefin alloy used in the present invention is an advancement in such art because of the significant modulus-modification properties imparted by the precisely engineered polymeric structure achieved via metallocene catalysis of two different olefinic monomers, typified by ethylene-octene copolymers preferably used as the co-alloy ingredient in this invention.

The present invention is not limited in the construction of the polyolefin alloy to one polyolefin and one modulus-modifying olefinic copolymer produced via metallocene catalysis. More than one olefin, more than one modulus modifying copolymer, or both, are desirable, depending on the selection of ultimate handling, application, and performance properties desired by one skilled in the art for the use of the invention as a surface covering.

For example, LLDPE, LDPE, and EVA can all be included in the polyolefin component of the polyolefin alloy, with a compatible ethylene-octene copolymer providing elastomeric properties and affecting the modulus of the polymer alloy.

As between the two co-alloy component types, the polyolefin(s) represents from about 31 to about 97 parts, and preferably from about 75 to about 89 parts, per one hundred parts of resin.

Conversely, the metallocene-catalyzed olefin copolymer represents from about 3 to about 69 parts, and preferably from about 11 to about 25 parts, per one hundred parts of resin.

More preferably, the alloy comprises LDPE, LLDPE, EVA, and the Engage 8020 polymer. Most preferably, two different LLDPE polymers are used.

Table 1 shows ranges of acceptable, desirable, and preferred weight percents of the various polymers, relative to the total weight of the compound, all being expressed in approximate values, for a preferred embodiment of the invention. The Polyolefin subtotal is provided to distinguish the thermoplastic component of the alloy, as compared with the polyolefin elastomer component of the alloy.

TABLE 1

Weight Percent of Resin Ingredients to Total Compound

| Polymer | Acceptable (Wt. %) | Desirable (Wt. %) | Preferred (Wt. %) |
| --- | --- | --- | --- |
| LDPE | 2-20 | 4-12 | 6-10 |
| LLDPE | 5-40 | 20-30 | 22-27 |
| EVA | 2-12 | 2-8 | 3-6 |
| Polyolefin Subtotal | 9-72 | 26-50 | 31-43 |
| Metallocene-Catalyzed Olefin Copolymer | 2-20 | 2-14 | 5-10 |

Flame-Retardant Agents

In contradistinction to the disclosure of U.S. Pat. No. 6,414,070, a combination of nanoclay and inorganic flame retardant is required for the practice of the present invention. Both types of flame-retardant agents contribute different flame-retardancy to the polyolefin alloy described above. Moreover, the present invention intentionally prefers to avoid any halogen-containing flame-retardant agent. Therefore, it is preferable for the combination of flame-retardant agents to be essentially halogen-free.

1. Nanoclays

Nanoclay is a clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an intercalant. An intercalate is a clay-chemical complex wherein the clay gallery spacing has increased, due to the process of surface modification by an intercalant. Under the proper conditions of temperature and shear, an intercalate is capable of exfoliating in a resin matrix. An intercalant is an organic or semi-organic chemical capable of entering the montmorillonite clay gallery and bonding to the surface. Exfoliation describes a dispersion of a surface treated nanoclay in a plastic matrix.

In exfoliated form, nanoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the surface treated nanoclay and the plastic matrix. In polymer compounding, a nanocomposite is a very convenient means of delivery of the nanoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites.

Nanocomposites offer flame-retardancy properties because such nanocomposite formulations burn at a noticeably reduced burning rate and a hard char forms on the surface. They also exhibit minimum dripping and fire sparkling.

When using Nanocor produced nanoclay, the amount of this group of flame-retardant compound can range from about 2 weight percent to about 5 weight percent, and preferably about 3 weight percent of the total compound.

Other nanoclays that are suitable for use in the present invention are identified in U.S. Pat. No. 6,414,070 (Kausch et al.) and PCT Patent Publications WO 00/66657 and WO 00/68312.

2. Inorganic Flame Retardants

Inorganic flame retardants, especially those that are essentially halogen-free, are well known to the polymer compounding industry for a wide variety of uses. One or more inorganic flame retardants can be employed in the present invention and can be selected from two principal types of agents: (1) borate salts; and (2) metallic hydroxides.

Borates

A wide variety of borates are suitable for use in the present invention. Non-limiting examples of borates include zinc borate, sodium borate (also known as borax), barium borate, kernite, ammonium borate, magnesium borate and, generally, all alkaline earth metal borates not otherwise listed herein. Such use of borates is explained, for example, in U.S. Pat. Nos. 6,387,993; 6,420,470; 6,423,251; 6,454,968; and 6,576,696.

Of these possible borates, zinc borate is most preferred.

The amount of borate(s) present in the flame-retardant compound of the present invention can range from about 2 weight percent to about 5 weight percent, and preferably about 3 weight percent of the total compound.

Hydroxides

A wide variety of hydroxides are suitable for use in the present invention. Non-limiting examples of hydroxides include magnesium hydroxide, aluminum hydroxide (also known as alumina trihydrate), barium hydroxide, calcium hydroxide, zirconium hydroxide, dolomite, and hydrotalcite, and combinations thereof. Such use of hydroxides is explained, for example, in U.S. Pat. Nos. 6,232,377; 6,492,453; 6,531,530; 6,547,992; 6,555,605; and 6,576,691.

Of these possible hydroxides, both aluminum hydroxide and magnesium hydroxide are preferred, with a combination of them being most preferred.

The amount of hydroxide(s) present in the flame-retardant compound of the present invention can range from about 2 weight percent to about 70 weight percent, and preferably from about 30 weight percent to about 40 weight of the total compound.

Of these weight percents, when a combination of aluminum hydroxide and magnesium hydroxide are use, the latter is dominant.

More preferably, the hydroxide flame-retardant agent can be present in a minimum of about 55 parts per 100 parts of resin, with magnesium hydroxide most preferably constituting as much as about 65 parts of the final compound, per 100 parts of polyolefin alloy resin.

Combination Effect of Flame-Retardant Agents

The two PCT Publications WO 00/66657 and WO 00/68312 discuss the benefits of a combination of flame-retardant agents. Also, Nanocor, Inc. has reported in a Technical Paper on its Web Site (Lan et al., "FR Applications of Plastic Nanocomposites") that there is a combination effect of its Nanomer brand nanoclay particle with magnesium hydroxide to pass an Underwriters' Laboratory test UL 94 vertical burning testing method.

Notwithstanding such documentation, it is unexpected that the combination of polyolefin alloy (essentially halogen-free) with the combination of flame-retardant agents (essentially halogen-free) provide the benefits found in the present invention to pass the stringent ASTM Test E84 in respect of wall and ceiling covering using the glass-reinforced concrete board as the testing substrate.

Not being limited to a particular theory, it is believed that the combination of nanoclay (providing a charring property); hydroxide (elevated decomposition temperature and water volatilization); and borate (accelerated carbonization) makes a preferred embodiment eligible to pass the stringent ASTM E84 test using the glass-reinforced concrete board as the testing substrate. Moreover, the flame-retardants of this preferred embodiment are compatible with, and do not otherwise deleteriously affect the manufacturing, application, and performance properties of the polyolefin alloy component of the compound of the present invention, particularly when formed into a surface covering.

Optional Additives

As with any polymeric resin-based compound, optional additives can provide easier processing and more desirable final appearance and properties for the compound.

Non-limiting examples of optional additives include fillers, antioxidants, stabilizers, lubricants, pigments, biocides, and the like. None of these ingredients is essential to the performance of the compound as a flame-retardant polymeric material. But each of them can provide added value to the final compound when included for their intended purpose. Each of these additives is commercially available from well-known sources known to those skilled in the art.

For example, fillers can range from about 1 to about 10, and preferably from about 2 to about 3 weight percent of the compound.

Antioxidants can range from about 0.03 to about 0.1, and preferably from about 0.05 to about 0.07 weight percent of the compound.

Stabilizers can range from about 0.1 to about 0.5, and preferably from about 0.11 to about 0.13 weight percent of the compound.

Lubricants can range from about 0.1 to about 1, and preferably from about 0.7 to about 0.8 weight percent of the compound.

Pigments can range from about 0 to about 20, and preferably from about 10 to about 11 weight percent of the compound.

Biocides can range from about 0.5 to about 5, and preferably from about 2 to about 3 weight percent of the compound. In those instances when it is desirable to have an essentially halogen-free polymeric compound, selection of the biocide(s) should concentrate on avoiding brominated biocidal compounds. Organic phosphorus compounds have been used as halogen-free biocides. Other antimicrobial agents are disclosed in U.S. Pat. No. 6,294,589.

Unexpectedly, it has been found that a particularly useful non-halogenated biocide is barium metaborate, because of its bacteria-killing properties. Use of barium metaborate achieves a completely essentially halogen-free with the polyolefin compound of the present invention and also with other polyolefin compounds regardless of the constituents of the alloy or the flame-retardant agents, so long as such constituents are also essentially halogen-free.

Physical Forms of the Compound

Using conventional extrusion, molding, calendering, or other form-generating production equipment, the compound of the present invention can be made into a variety of forms. The flame-retardant properties of the compound resides throughout the mass of the compound, whatever its form. Non-limiting examples of forms are films, profiles, articles, fibers, and the like.

Films can have dimensions ranging from about 0.2 mm to about 0.5 mm (8 to 20 mils), and preferably from about 0.2 mm to about 0.3 mm in thickness and ranging from about 40 cm to about 187 cm (16 to 74 inches), and preferably from about 71 cm to about 162 cm in width. Length is generally dependent on the size of a roll of the film. Films can be solid or be a membrane, depending on means of formation according to techniques known to those of skill in the art. Films can be reinforced or unreinforced, according to techniques known to those skilled in the art.

Profiles can also be made from extrusion of compounds of the present invention of any three-dimensional shape according to the shape of the profile die used during extrusion.

Articles can be made from a mold using compounds of the present invention according to any cavity shape of the mold, whether male or female and whether formed via heat, heat and pressure, heat and vacuum, or the like.

Fibers can be made of the compounds of the present invention, whether in the form of woven fibrous structures or nonwoven fibrous structures, according to production techniques known to those skilled in the art.

Regardless of desired form, made using teachings from encyclopedia, technical literature, or patent literature, the flame-retardant properties of the compound drive which form is employed.

Of all of these forms, films and sheets are preferred because such forms provide the most amount of area for a surface coverings.

Surface Coverings

A surface covering can be a single film or sheet of a compound of the present invention or can be a laminate with other materials that provide reinforcement or other structural stability. U.S. Pat. No. 6,414,070 (Kausch et al.) discloses how one might combine a film or sheet of the present invention with a reinforcing layer, a polymer layer, or both.

The flame retardant laminate generally comprises a top layer comprising a flame retardant sheet of the present invention, a bottom layer generally comprising a reinforcing backing such as a woven or nonwoven polymer fabric layer such as polyester, nylon, etc. Optionally, beneath the bottom layer, one can also add a lowermost layer which can be any suitable polymer layer (e.g., polyolefins as defined above or polyvinyl chloride). However, if one desires to retain the essential halogen-free nature of the compound of the invention in the form of a surface covering, then the lowermost layer can not be polyvinyl chloride.

Lamination of a film or sheet of the present invention to another layer may need to have adhesion as the means of attachment. If an adhesive is used, then it should not detract from the flame-retardant properties of the film or sheet. Many commercial sources of adhesives can be investigated without undue experimentation to determine compatibility for use of such adhesive in a laminate that is to be tested according to ASTM E84. Commercial sources include Avery Dennison Corporation (www.averydennison.com), 3M Company (www.3M.com), and Worthen Industries (www-.worthenind.com). Water-based adhesives are preferred. Suitable water-based adhesives include Scotch brand Pro-Spray brand Water-Based Mounting Adhesives from 3M Company and WA brand water based adhesives from Worthen Industries. For the ASTM E84 test, the adhesive selected for use was WA-405 adhesive commercially available from Worthen Industries.

Alternatively, one can embed a scrim within a film of the present invention, according to techniques taught in U.S. Pat. No. 5,260,113 (Pontuti et al.).

Surface coverings are particularly important in buildings and other mammalian-occupied spaces, such as airplane compartments, where customers desire the handling attributes of a polyolefinic film or sheet or molded article but need the flame-retardancy to substantially quell fire spreading in a confined space with limited possibilities of egress. Tragedies of fire in confined spaces such as airplanes, night clubs, and other crowded locations with limited exit passageways occur every year. Providing a surface covering of the present invention, on walls, ceilings, and/or floors might make a significant difference in loss of life and loss of property.

Method of Making Compound

Compounding the compound of the present invention can take any number of routes according to preferences of those familiar with the compounding of thermoplastic materials. In one route, each ingredient is mixed into a large vessel. In another route, batches of ingredients are first formed and then the batches are combined.

As preferred in the present invention, the following well-known steps can be employed in the following sequence: blenders containing ingredients feeding a hopper upstream from a Banbury-type mixer; followed by straining, conveying, and calendering using embossing rolls, followed by cooling and winding operations.

The mixing step can be batch-based in a Banbury-type mixer or continuous in a Farrell brand Continuous Mixer (FCM).

Regardless of the means of mixing, the transformation of compound into a particular form relies on calendering, extrusion or molding techniques, also well known to those skilled in the art. For example, a thorough mixture of ingredients can be fed into a calendering operation to generate a film, an extruder with a film die on the outlet to also generate film, or with a profile die on the extruder outlet to generate a profile.

Preferably, compound of the present invention uses a Banbury mixer where the ingredients are added in the following sequence steps: (1) polyolefin(s); (2) a masterbatch of flame retardants, fillers, white pigment, and biocides; (3) antioxidant, stabilizer, and lubricants added individually; (4) optionally, other pigments to impart color, if desired; and (5) remaining polyolefins and modulus-modifying metallocene-catalyst olefin copolymer.

Temperatures, durations, and rotation speeds are customary as used in the art of thermoplastic compounding. For example, the rotation speed can range from about 40 to about 60 and preferably about 50 revolutions per minute (RPM). The drop temperature of the melted, thoroughly mixed compound can be at least above the melting of the polymers of the alloy and preferably at least about 150° C.

Usefulness of the Invention—Passage of ASTM E84

EXAMPLES

General Experimental Testing Procedures

ASTM Test E84 has undergone a revision in 2003. In the proof of efficacy of the compounds of the present invention, ASTM Test E 84-01 was used. As of the filing of this patent application, the Test is now E 84-03.

General Experimental Materials Examples

Table 2 shows the ingredients and weight percents of them to the total composition in the order of addition to the Banbury mixer.

TABLE 2

| Chemical | Trade Identifier | Commercial Source | Weight Percent | Order of Addition |
|---|---|---|---|---|
| EVA | Evatane 2403 | Atofina | 4.10% | 1 |
| LLDPE | LL 1002 | ExxonMobil | 21.03% | 1 |
| Titanium Dioxide Pigment | RCL 4 | Millenium | 4.45% | 2 |
| Aluminum Trihydrate Flame Retardant | PGASD | Alcoa | 4.45% | 2 |
| Nanoclay Flame Retardant | I-31PS | Nanocor | 3.17% | 2 |
| Zinc Borate Flame Retardant | Firebrake ZB | U.S. Borax | 3.17% | 2 |
| Magnesium Hydroxide Flame Retardant | Magnifin H-10 | Albemarle | 29.04% | 2 |

TABLE 2-continued

| Chemical | Trade Identifier | Commercial Source | Weight Percent | Order of Addition |
|---|---|---|---|---|
| Calcium Carbonate Filler | Omya FT | Omya | 8.54% | 2 |
| Barium Metaborate Biocide | Busan 11MI-F | Buckman Laboratories | 2.23% | 2 |
| Organic Phosphite Stabilizer | Ultranox 641 | General Electric | 0.12% | 3 |
| Hindered Phenol Antioxidant | Irganox 1010 | Ciba Geigy | 0.06% | 3 |
| Calcium Stearate Lubricant | Calcium Stearate | Crompton | 0.23% | 3 |
| Stearic Acid Lubricant | Stearic Acid | Crompton | 0.30% | 3 |
| Zinc Stearate Lubricant | ZNST Listab DPC | Chemson | 0.21% | 3 |
| Pigments | Various | Various | 0.17% | 4 |
| LDPE | LD51348 | ExxonMobil | 8.37% | 5 |
| LLDPE | LL 5105 | ExxonMobil | 3.03% | 5 |
| Ethylene-Octene Copolymer | Engage 8020 | DuPont Dow Elastomers | 7.31% | 5 |
| | | | 100.00% | |

The Banbury was operated at about 50 RPM and set to dump at about 154° C. The dump occurred at about 4-5 minutes. After compounding, the compound was calendered into a film roll of 0.254 mm thickness and of 142 cm width. A layer of Worthen WA405 adhesive to one major surface of the film, to which was applied, for purposes of the ASTM E84 test, a non-woven scrim. This laminate was taken to a testing laboratory certified to conduct the ASTM E84 Test. The laminate was then adhered using the same adhesive to a glass-reinforced concrete board and tested according to ASTM Test E84-01. The laminate passed the test. It should be noted that a woven scrim-backed film of the present invention was also tested. For reasons unknown, that test failed. However, because the only difference was the selection of the scrim for reinforcement, the film surface covering of the present invention is believed to have sufficient flame retardancy to consistently pass the ASTM E84 test.

The invention is not limited to the above embodiments. The claims follow.

What is claimed is:

1. A flame-retardant compound, comprising:
   (a) a polyolefin alloy of two different types of polyolefins; and
   (b) a combination of flame-retardant agents,
   wherein one type of polyolefin comprises two polyethylene polyolefins and ethylene-vinyl acetate and
   wherein the other type of polyolefin is an elastomeric olefin copolymer to modify the modulus of the first type of polyolefin wherein the copolymer comprises ethylene monomer and a second olefin monomer comprises octene monomer,
   wherein the flame-retardant agents comprise an intercalated nanoclay and at least one inorganic flame-retardant, and
   wherein one inorganic flame-retardant is a hydroxide present in the compound of at least 65 parts by weight, per 100 parts by weight of polyolefin alloy.

2. The compound of claim 1, wherein there are at least two types of inorganic flame-retardants, and wherein one is a borate and another is a hydroxide.

3. The compound of claim 2, wherein the hydroxide comprises magnesium hydroxide and aluminum hydroxide.

4. The compound of claim 1, wherein the elastomeric olefin copolymer is an olefin copolymer comprising from 2 to 20 weight percent of the total compound.

5. The compound of claim 1, further comprising additives selected from the group consisting of fillers, antioxidants, stabilizer, lubricants, pigments, biocides, and combinations thereof.

6. The compound of claim 1, wherein the compound is essentially halogen-free.

7. A biocidal, essentially halogen-free flame-retardant compound, comprising:
(a) an essentially halogen-free polyolefin alloy of two different types of polyolefins;
wherein one type of polyolefin comprises two polyethylene polyolefins and ethylene-vinyl acetate and
wherein the other type of polyolefin is an elastomeric olefin copolymer to modify the modulus of the first type of polyolefin wherein the copolymer comprises ethylene monomer and a second olefin monomer comprises octene monomer;
(b) an essentially halogen-free flame retardant including an intercalated nanoclay; and
(c) a biocide consisting essentially of barium metaborate.

8. The compound of claim 7,
wherein the flame-retardant agents comprise an intercalated nanoclay and at least one inorganic flame-retardant.

9. The compound of claim 8, wherein there are at least two types of inorganic flame-retardants, and wherein one is a borate and another is a hydroxide.

10. The compound of claim 9, wherein the hydroxide comprises magnesium hydroxide and aluminum hydroxide, and wherein the hydroxide is present in the compound of at least 65 parts by weight, per 100 parts by weight of polyolefin alloy.

11. The compound of claim 7, further comprising additives selected from the group consisting of fillers, antioxidants, stabilizer, lubricants, pigments, and combinations thereof.

12. An article made from a compound according to claim 1, wherein the compound is in the form of a film, a fiber, or a profile.

13. The article according to claim 12, wherein the article is a surface covering comprising the film attached to a water-based adhesive.

14. The article according to claim 12, wherein the article is a surface covering laminate comprising a film as a top layer and a reinforcing backing as the bottom layer and wherein the reinforcing backing is attached to an adhesive.

15. A mammalian-occupied space having surfaces having a surface covering comprising:
a film attached to a water-based adhesive,
wherein the film comprises:
(a) a polyolefin alloy of two different types of polyolefins; and
(b) a combination of flame-retardant agents,
wherein one type of polyolefin comprises two polyethylene polyolefins and ethylene-vinyl acetate and
wherein the other type of polyolefin is an elastomeric olefin copolymer to modify the modulus of the first type of polyolefin wherein the copolymer comprises ethylene monomer and a second olefin monomer having from 3 to 18 carbon atoms, and
wherein the flame-retardant agents comprise an intercalated nanoclay and at least one inorganic flame-retardant,
wherein one inorganic flame-retardant is a hydroxide present in the compound of at least 65 parts by weight, per 100 parts by weight of polyolefin alloy, and
wherein the surface covering passes ASTM E84-01 flame test when using a glass-reinforced concrete board substrate.

* * * * *